Patented Mar. 5, 1940

2,192,273

UNITED STATES PATENT OFFICE 2,192,273

BANANA PRODUCT AND BANANA DRYING PROCESS

Henri Daniel Rey, Papeete, Tahiti, assignor to The Anglo California National Bank of San Francisco, San Francisco, Calif., a banking corporation No Drawing. Application May 27, 1938, Serial No. 210,433

12 Claims. (Cl. 99—104)

This invention relates to a banana drying process and product, and has for its objects a process for treating bananas whereby a rich, full-flavored, fully ripened banana of pleasing brown or amber-color is produced, and which banana is uniformly tender and soft throughout and without a hardened exterior, and which banana has good keeping qualities without the use of preservatives and in which nothing is removed except water. A further object is a new banana product of the above character that in which the remaining juices therein are substantially uniformly distributed throughout the body, and in which banana product, the degree of ripening thereof has been carried on appreciably further than is normally possible whereby the flavor is appreciably greater than in normal ripening, and which product is ready for eating without cooking or additional preparing of any kind. This application is a continuation in part of application, Serial No. 91,909, filed July 22, 1936.

Before describing my invention, it may facilitate a better understanding of the invention to point out that many previous attempts have been made to dry bananas, some of which products are called "banana figs." However, mere drying of bananas, whether by sun drying or by heated air, and whether by continuous or stage drying, results in a hard, bone-dry product throughout the body of the fruit commencing with the outer surface, and fruit so dried are lacking in flavor and are dark and unattractive in appearance. If the bananas are pre-cooked or subjected to a cooking or roasting temperature before drying, the finished product undergoes a chemical change due to the loss of sugar and pectin and the subsequently dried product has the hard exterior and the flavor is not only quite different, but is lacking in those respects essential to full enjoyment of the product for eating purposes, even though some water may remain in the fruit.

In my process, I preferably use bananas that are cut from the tree four or five days before they turn yellow, although I may use the bananas as cut from the trees from fifteen to twenty days before they are yellow, which is the time the ordinary bananas for commercial sale are cut from the tree. Where the bananas are cut from the tree in the dry season, they should be placed in a humid room until they are a deep yellow in color and commence to turn black in spots, but where cut in the humid season they should be treated just before the black spots appear, otherwise the finished product would be darker than is desired. The so-called Samoan variety of bananas most commonly found in the Hawaiian Islands and in Tahiti and the variety most common in the Central American countries are treated in substantially the same manner after they are fully ripened and have reached the desired color, as above explained.

This treatment comprises lightly kneading the unpeeled fruit from end to end thereof as with the fingers. One kneading only from one end to the other of each banana is generally sufficient, except perhaps for the so-called Rio bananas, which have a relatively hard flesh, but which are kneaded until the body of the fruit is of jelly-like consistency.

The above kneading breaks up or disrupts the cells of the fruit, which softens the fruit and distributes the juice uniformly throughout the fruit bodies giving the bodies a syrupy, jelly-like consistency and causes a rapid further ripening of the fruit which greatly increases the flavor and functions to prevent a hardening of the fruit, either exteriorly or interiorly during the later drying steps, in the manner as occurs were this preliminary kneading step eliminated.

After the bananas are kneaded, the skins are removed, the bodies being soft but sufficiently cohesive for manipulation. The peeled pre-kneaded fruit bodies are subjected to several successive stages of drying in currents of hot air interposed between periods of rest. In the dry season the time of drying is shortened and the time of rest is lengthened relative to the times of drying and of rest in the wet or humid season. During the periods of rest, the bananas are placed in a ventilated room having air at atmospheric temperature, but not in a current of air, since a current of air in the room would tend to stop further desired ripening of the fruit and the fruit would dry up, and without ventilation or air, the bananas would turn sour.

After each drying step and before the bananas are placed in a room for the period of rest, the bananas must be cooled down by blowing ordinary cool air over them for a few minutes, since if the bananas are placed in the room while warm, they would start to sweat and turn dark, resulting in bad-tasting fruit unfit for eating.

Each drying step is conducted a sufficient time to evaporate a portion only of the moisture from the same leaving moisture in the fruit bodies to promote further ripening and even after the final drying step, there is moisture in the bodies, but this has been reduced to a relatively stiff syrup-like consistency that preserves the fruit against spoiling or further ripening, the final drying step being at a sterilizing temperature.

Sun drying is as effective as oven or tunnel drying, only it takes a longer time and more labor, since the bananas are turned about twice daily. In oven or tunnel drying, where the bananas are placed on a wire screen or the like, the hot air will, of course, circulate on all sides of the fruit substantially equally and turning is not necessary. The final drying step, if in the sun, is done on metal in the sun between 11:00 a. m. to 2:00 p. m. in the tropics.

After the finished drying or sterilizing step, the bananas are cooled down, and are then packed in waterproof "Cellophane" or paraffine paper or other waterproofed containers to guard against further loss of moisture in dry climates or the acquisition of more moisture in humid or damp climates. The bananas, respectively, when ready for packing are reduced to about half or less than half the diameter of the original fruit, and are of an amber or brown color of about that of ordinary dried dates, and are firm, but soft and tender throughout, and of a delicious flavor, aroma and sweetness never found in the fresh fruit of commerce.

The drying steps are preferably at sterilizing temperatures but not sufficient to melt the fruit or to cause loss of juices other than that water that will evaporate therefrom. For example, a drying heat of about 130° to 150° F. in air forced over and through the fruit at from about 300 to about 400 feet per minute will insure rapid absorption of the moisture without melting the fruit and will effectively sterilize the fruit against development of mold spores or decomposition or spoiling, in ordinary climates where the humidity is low. Where the air used in the drier is very humid or very dry to begin with, the heat required will correspondingly be higher or lower as the case may be. It is important to note, however, that if cold air or air at ordinary temperatures is forced over the fruit, and no extraneous heat applied, a hard and tough exterior will be formed on the fruit bodies and the fruit would not be in edible condition without cooking, whereas by my process the finished bananas are soft and tender throughout, and remain so for several years or longer.

The first application of heated air, where the fruit is placed in the drier, is maintained for about four hours, or until about one-third of the moisture is evaporated and it is then taken out of the drier and permitted to stand for about 12 hours after which a second application of heated air is given for about 3 hours, or until about one-half the remaining moisture is removed and the fruit is almost half its original diameter. The fruit is then permitted to stand at room temperature for about twenty-four hours after which it again goes to the drier for about two hours. The next rest period out of the drier is for about forty-eight hours and then it finally goes to the drier for about one-hour's time with the air at about 150° F. and after this final step it is cooled down and packed immediately after cooling.

In certain instances, where, for example, the bananas are larger in diameter or vary, appreciably, it is found desirable to subject the fruit to more than four applications of heated air, and the length of time in the drier in the successive application of heat may be three hours, two hours, two hours, two hours and one hour at successive intervals instead of the times above given. The periods of rest, of course, intervene between application of heat.

In either of the above instances, it is to be noted that the bananas should be cooled down after each application of heat, as has already been explained.

A convenient and satisfactory way of packing the fruit is to assemble about a half dozen or a dozen of the "dried" bananas in a bundle and wrap the same in waterproof "Cellophane" before placing in a container. The use of the term "dried" in this application and in the claims means partially dried, since there is still some moisture remaining in the fruit.

The physical characteristics of my product that distinguishes over the so-called "banana figs" and other dried or partially dried bananas, is the fact that my product has a very rich flavor due to the progressive ripening steps after each application of heat, whereas bananas that are merely dried after they are ripe are relatively tasteless and the same lack of flavor exists where bananas are subjected to a cooking temperature before drying, since sugar and pectin is driven off in a syrupy fluid. Also unless the bananas are initially kneaded, so as to "mechanically" break up or disrupt the cells, the finished product by any drying step or steps is not tender throughout, but is either hard, where the fruit is completely dried, or a tough hard shell forms on the exterior if only partially dried. It is further observed that without the initial kneading and stage drying, partially dried bananas will not keep satisfactorily.

It is obvious to be seen that the successive drying steps and periods of rest for ripening out of a dry room, and out of a current of air, but in a ventilated room, plus the initial kneading step, results in a product that is physically decidedly different from anything heretofore produced insofar as I am aware, and is a new product. The term "mechanically disrupted" as used in the claims refers to a result from finger or machine manipulation.

Having described my invention, I claim:

1. As a new article of manufacture, a peeled ripened banana body having the outer layer of cells disrupted and partially dried to a condition of stability and the juices of the remaining portion of the banana body substantially evenly distributed throughout the body including said outer layer whereby said body is substantially uniformly soft and tender throughout.

2. As a new article of manufacture, a peeled, ripened banana body having the cells of its outer layer broken up, and which body is partially dried to a condition of stability for packing with the remaining juices therein substantially evenly distributed throughout the body including said outer layer.

3. The process of treating fresh bananas which comprises applying a kneading pressure to the substantially ripe fruit while still in the skin, thereafter removing the skin and subjecting the kneaded fruit bodies to controlled drying until the bodies have been reduced to a stabilized, soft, tender form for packing.

4. The process of treating fresh bananas which comprises applying a kneading pressure to the substantially ripe fruit while still in its skin, thereafter removing the skin and subjecting the kneaded fruit bodies to several stages of drying interposed with relatively long periods of rest until the bodies have been reduced to a stabilized, soft, tender form for packing.

5. The process of treating fresh bananas that includes the steps of disrupting the outer layer of flesh of the fruit below the skins, removing the skins, subjecting the fruit to a current of heated air, cooling the fruit, then placing the cooled fruit in a ventilated area out of said current of heated air for a predetermined period of time, and thereafter again subjecting the fruit to the current of heated air and thereafter placing the fruit in a ventilated area out of said current of heated air.

6. The process of treating fresh bananas that includes the steps of softening the bodies of the fruit within the skins by physical manipulation of the fruit, thereafter peeling the fruit and subjecting the softened bodies to a drying heat at intervals of time separated by periods of rest until the softened fruit bodies have been reduced to a partially dry but soft condition of stability for packing.

7. A new article of manufacture comprising a ripened and partially dried banana body from which water only has been removed and in which the outer layer of cells has been disrupted and the juices therein distributed over the outer surface of the body and partially dried to a firm, but relatively soft, rubbery consistency thereby forming a coating of partially dried juices of substantially uniform rich brown color, and in which body the remaining juices are substantially uniformly distributed, said body, inwardly of said coating being of substantially the same consistency and texture as said coating, and the ratio of sugar content of said body and coating to the remaining moisture therein being sufficient to preserve the body and coating against spoilage when exposed to the atmosphere.

8. The process of treating fresh bananas which comprises removing the skins of the fruit and passing currents of heated air over the skinless bodies a plurality of times separated by relatively long intervals of rest at substantially room temperatures to permit progressive further ripening of the fruit, the heated air being sufficiently hot to destroy any fungicidal growth set up in the fruit during the preceding interval of rest, and the total duration of the hot air treatment maintained until the bananas are reduced to a partially dry but soft condition of stability for packing.

9. A process as specified in claim 8 wherein the air treating intervals are for successively shorter periods of time and the intervals of rest are for successively longer periods of time.

10. A process as specified in claim 8 wherein the flowing hot air is at about 150° F. and the successive applications of it to the fruit are respectively of about 4, 3, 2 and 1 hours time and the successive periods of rest at room temperatures are respectively about 12, 24 and 48 hours.

11. A process as specified in claim 8 in which the bananas are first subjected to a kneading action along all sides of their bodies before removing their skins.

12. A process as specified in claim 8 in which the bananas are first subjected to a resilient kneading action progressively applied once only along the bodies from one end to the other before removing the skins.

HENRI DANIEL REY.